United States Patent [19]
Bernd-Holger

[11] Patent Number: 4,603,761
[45] Date of Patent: Aug. 5, 1986

[54] FLOATING CALIPER TYPE DISC BRAKE

[75] Inventor: Röhling Bernd-Holger, Andernach, Fed. Rep. of Germany

[73] Assignee: Lucas Industries public limited company, Birmingham, England

[21] Appl. No.: 640,798

[22] Filed: Aug. 14, 1984

[30] Foreign Application Priority Data

Aug. 18, 1983 [DE] Fed. Rep. of Germany ... 8323802[U]

[51] Int. Cl.⁴ ............................................. F16D 65/02
[52] U.S. Cl. ................................................. 188/73.45
[58] Field of Search ................. 188/73.45, 73.44, 72.5, 188/72.4, 370, 369, 368, 106 A, 106 P, 73.43, 73.39, 72.3, 216; 277/212 FB, 225

[56] References Cited

U.S. PATENT DOCUMENTS

| 3,917,033 | 11/1975 | Rath et al. | 188/73.45 |
|---|---|---|---|
| 4,234,061 | 11/1980 | Margetts et al. | 188/73.45 X |
| 4,341,289 | 7/1982 | Smith | 188/73.45 X |
| 4,448,288 | 5/1984 | Delaunay | 188/73.45 |

FOREIGN PATENT DOCUMENTS

| 0109834 | 8/1980 | Japan | 188/73.44 |
|---|---|---|---|
| 0119235 | 9/1980 | Japan | 188/73.44 |
| 2078884 | 6/1982 | United Kingdom . | |

Primary Examiner—Douglas C. Butler
Attorney, Agent, or Firm—Scrivener Clarke Scrivener and Johnson

[57] ABSTRACT

A spot type disc brake comprises a floating caliper supported for displacement on a carrier by a pair of guide pins and corresponding guide bores. The caliper straddles a pair of brake pads one of which is adapted to be pressed into contact with a brake disc directly by a brake actuator and the other one by displacement of the caliper caused by the brake actuator. The brake further comprises sealing members sealing the sliding surfaces of each guide pin and the corresponding guide bore. Each guide pin includes a collar in the area of that end which extends from the guide bore toward the brake disc, and the respective sealing member is arranged to be protected behind the collar.

1 Claim, 1 Drawing Figure

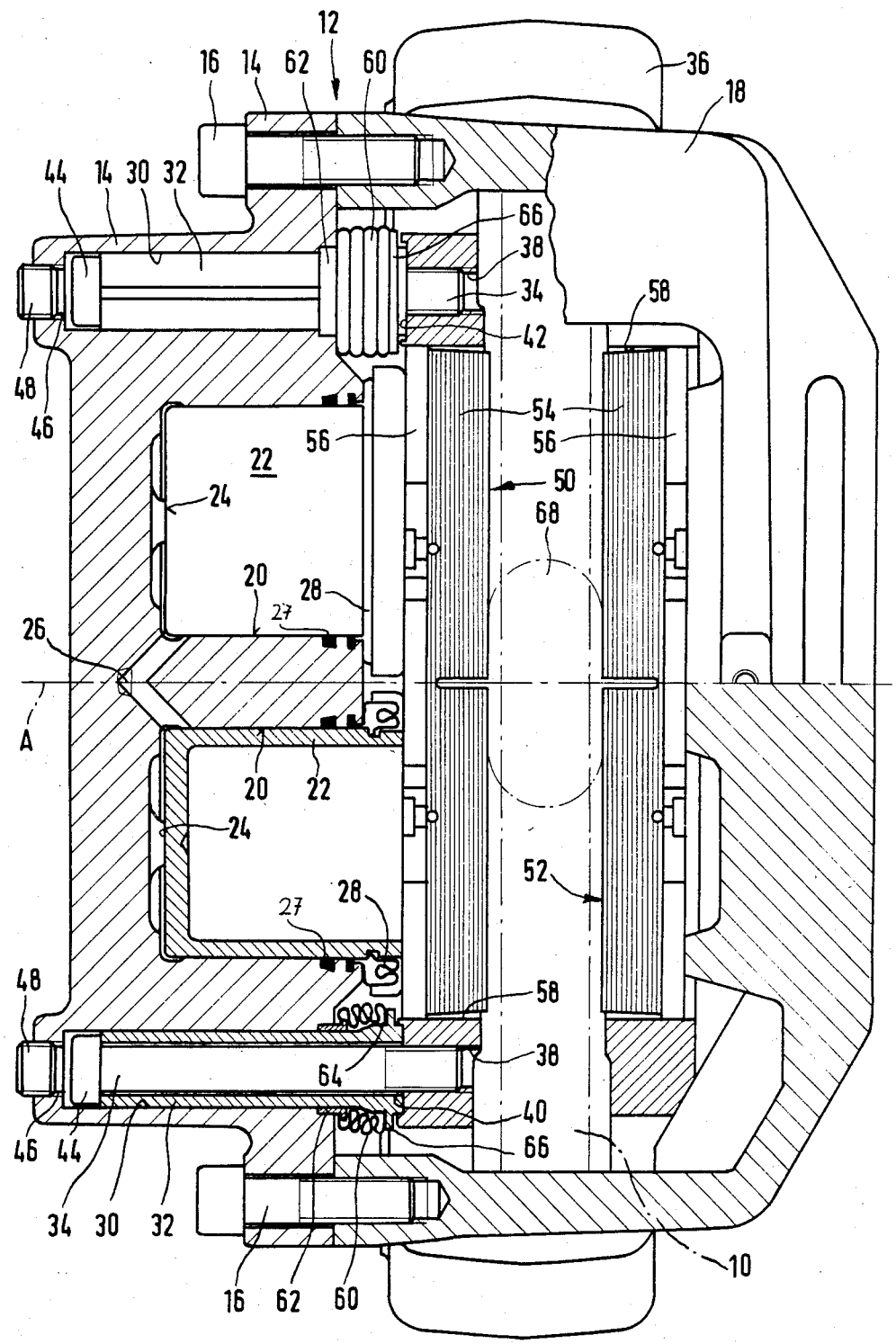

FLOATING CALIPER TYPE DISC BRAKE0

The invention relates to a spot type disc brake, comprising a floating caliper supported for displacement on a carrier by a pair of guide pins and corresponding guide bores and straddling a pair of brake pads, one of which is adapted to be pressed into contact with a disc brake directly by a brake actuator and the other one by displacement of the caliper caused by the brake actuator, further comprising sealing members for sealing sliding surfaces of each guide pin and the corresponding guide bore from the outside.

Disc brakes of this kind are known, for instance from U.S. Pat. No. 4,341,289. Here the guide pins are fixed either to the carrier or to the caliper, and the guide bores are formed accordingly, either in the caliper or in the carrier. In both cases one end of a bellows type sealing member is fixed to at least one end of each guide pin, while the other end of the sealing member is fixed to the caliper or carrier all around the guide bore. The other end of each guide bore either is sealed as well with respect to the guide pin by sealing member, or it is closed, for instance by designing the guide bore as a blind bore. In this manner the sliding surfaces of the guide pins and guide bores are protected from loss of lubricant and contamination.

Disc brakes of the type recited above have proved highly successful in operation because the sliding pairs of guide pins and guide bores, protected as described, oppose the necessary displacements of the caliper during braking by practically unchanging small frictional resistance throughout the lifetime of a disc brake. However, at times signs of corrosion were observed on the guide pins and guide bores and practically always they could be attributed to previous damage of the corresponding sealing member. Such damage did occur although none of the component parts of the brake, when mounted on a vehicle, neither the caliper nor the brake pads, has so much freedom of movement that it could subject the sealing member to harmful stress, specifically squeeze it. Now it has been discovered that the squeezing of the sealing members may happen during transportation of the disc brakes in question and also when they are being installed in the axle of the respective wheel to be braked.

Based on this discovery, it is the object of the invention to develop a disc brake of the kind recited initially such that the risk of damaging the sealing members before and during installation of the brake is eliminated or at least greatly reduced.

This object is met, in accordance with the invention, in that the guide pins comprise a collar each in the area of their respective end protruding from the guide bore toward the brake disc and that the respective sealing member is arranged to be protected behind said collar. The collars preferably have an outer diameter which is at least almost as great as the greatest outer diameter of the sealing member.

In a particularly convenient embodiment of the invention the collars form stops which limit the movement of the directly operable brake pad directed toward the brake actuator. In this manner the space between the guide pins may be utilized to house the greatest possible directly operable brake pad without giving this brake pad a chance to damage the sealing members if it should be displaced accidentally in axial direction before or during assembly of the brake.

An embodiment of the invention will be described further with reference to a diagrammatic drawing. The drawing shows a disc brake according to the invention for motor vehicles, partly in section. The sectional plane contains a secant of the corresponding brake disc 10 indicated by dash-dot lines and extends parallel to the axis A therof.

The disc brake comprises a floating caliper 12 composed of a cylinder block 14 and a frame member 18 fixed to the same by screws 16. The cylinder block 14 constitutes the inner part of the caliper 12, with respect to the coresponding vehicle. Starting from the cylinder block 14, the frame member 18 straddles the brake disc 10, extending like a chord at the other side thereof, remote from the cylinder block 14.

The cylinder block 14 comprises a brake actuator 20, 22 having two cylinder bores 20 which extend parallel to the axis A and in each of which a piston 22 is guided which is abutted on a projection 24 in the middle of the respective cylinder bore 20, in the assembled position shown. A branching pressure fluid channel 26 opens into both cylinder bores 24 behind the piston 22. Both pistons 22 are sealed with respect to their cylinder bores 20 by a piston seal 27 and protrude out of their respective cylinder bores 20 in the directi of the brake disc 10 and are sealed by a sealing member 28 each with respect to the cylinder block 14.

The cylinder block 14 further comprises two guide bores 30 which likewise extend parallel to the axis A and lie in the same plane as the cylinder bores 20 which are disposed between the two guide bores 30. A guide pin 32 is guided in each of the guide bores 30, the guide pins being hollow and each fixed by a screw 34 extending through the same to a carrier 36. The carrier 36 is formed with a threaded bore 38 each for each of the two screws 34. Each threaded bore 38 begins at a recess 40 or 42 of the carrier 36.

The lower recess 40, as seen in the drawing, has a diameter which is adapted closely to the outer diameter of the end of the corresponding guide pin 32 so that the latter is held in position by a mechanical interlocking of the end of the pin 32 in recess 40. The upper recess 42, as seen in the drawing, for the other guide pin 32 has a greater diameter so that this other guide pin is free to adapt to the position of the corresponding guide bore 30 and is fixed in frictional engagement with the base of the recess 42 only upon tightening of the corresponding screw 34.

The screws 34 each have a hexagonal recessed head 44 and may be tightened by a hexagonal recess wrench introduced through a threaded bore 46 each of the cylinder block 14. Subsequently the threaded bores 46 are sealed tight by a threaded plug 48.

The two pistons 22 each have an annular end face in direct abutment with a directly operable brake pad 50 which is adapted to be moved into abutment against the inner side of the brake disc 10, with respect to the vehicle, by actuating the piston 22. An indirectly operable brake pad 52 acts on the other side of the brake disc 10, being the outer side with respect to the vehicle. This brake pad 52 is adapted to be pressed against the brake disc 10 by the forces of reaction exerted by the hydraulic pressure in the cylinder bores 20 on the cylinder block 14 displacing the caliper 12 axially inwardly, with respect to the vehicle, or to the left in the drawing.

Each of the two brake pads 50 and 52 has a brake lining 54 and a backplate 56 supporting the lining and guided for displacement between paraxial guide faces 58 of the carrier 36. The braking forces acting on the brake pads 50 and 52 in secant direction of the brake disc 10 upon braking, are transferred by the respective backplates 56 through the guide faces 58 directly to the carrier 36 so that they do not load the caliper 12 or, consequently, the guide pins 32.

In the area of their ends facing the brake disc 10 both guide pins 32 are sealed with respect to the cylinder block 14 by a bellows type sealing member 60. Each sealing member 60 is fixed at one end to a sleeve 62 which in turn is secured in an enlargement of the corresponding cylinder bore 20. The other end of each sealing member 60 is fixed in an annular groove 64 of the corresponding guide pin 32. Between this annular groove 64 and its outer end, each of the two guide pins 32 has a collar 66 whose outer diameter is at least almost as great as the greatest outer diameter of the corresponding sealing member 60.

For transportation and storage of the disc brake which is not yet assembled with the corresponding brake disc 10, the two brake pads 50 and 52 are spread apart by an elastic spacer 68 clamped between the brake linings 54. As shown, the spacer 68 usually is of circular section which is deformed into oval shape upon insertion between the brake linings 54.

Just like the brake disc 10 in assembled condition, the spacer 68 prevents axial displacement of the two brake pads 50 and 52 before and during assembly so that they do not lose contact with the corresponding guide faces 58 whereupon they might fall out. However, the spacer 68 also fulfills the vital function not duly appreciated so far of clamping the two brake pads 50 and 52 together with the caliper 12 in one unit, thus forcing both brake pads to become displaced together with the caliper 12 when the latter is displaced which may occur, for example, under the influence of gravity when the brake is held in inclined position or when it is put down obliquely.

The possibility of displacing the unit formed by the caliper 12 and the two brake pads 50 and 52 outwardly along axis A, to the right in the drawing, with respect to the carrier 36 is limited by the heads 44 of the screws 34 hitting the bottom of the respective guide bore 30 or the corresponding threaded plug 48 if the latter has been screwed in far enough. In this manner it is excluded that the sealing members 60 become overextended or separated from their respective fixings when such displacement occurs.

Upon displacement in the opposite direction, to the left in the drawing, however, there was the risk so far that sealing members 60 were pressed by the backplates 56 of the inner brake pad 50, with respect to the vehicle, thus either becoming squeezed or pushed out of the annular recess 64. This risk has been eliminated by the collars 66 whose outer diameter is so great that the brake pad 50 and its backplate 56 will abut against the collars 66 having no chance to reach the sealing members 60.

As shown in the drawing, each collar 66 may be formed integral with the associated guide pin 32. Yet it may also be formed by a separately produced ring which is fixed to the guide pin, for instance, being snapped into a groove.

What is claimed is:

1. A spot type disc brake, comprising a floating caliper (12) supported for displacement on a carrier (36) by a pair of guide pins (32) and corresponding guide bores (30) and straddling a pair of brake pads (50, 52) one of which is adapted to be pressed into contact with a brake disc (10) directly by a brake actuator (20, 22) and the other one by displacement of the caliper (12) caused by the brake actuator, and comprising sealing members (60) for sealing the sliding surfaces of each guide pin (32) and the corresponding guide bore (30) from the outside, each guide pin (32) comprising a collar (66) in the area of the respective end of the guide pin (32) extending from the guide bore (30) toward the brake disc (10), characterized in that the collars (66) form stops which limit the inward movement of th directly operable brake pad (50) in a direction toward the brake actuator, each collar being located relative to the end of a guide pin in a position to protect a respective sealing member (60) against damage which might otherwise be caused by the back-plate (56) of the brake pad (50) during said inward movement thereof.

* * * * *